United States Patent [19]

Stearn

[11] E Patent Number: Re. 31,829

[45] Reissued Date of Patent: Feb. 12, 1985

[54] TWO GROOVE HEADSTAY

[76] Inventor: Leathem S. Stearn, 111 N. First Ave., Sturgeon Bay, Wis. 54235

[21] Appl. No.: 401,534

[22] Filed: Jul. 26, 1982

Related U.S. Patent Documents

Reissue of:

[64] Patent No.: 3,851,609
Issued: Dec. 3, 1974
Appl. No.: 385,443
Filed: Aug. 3, 1973

U.S. Applications:

[63] Continuation-in-part of Ser. No. 282,414, Aug. 21, 1972, Pat. No. 3,851,608.

[51] Int. Cl.[3] ..... B63H 9/04

[52] U.S. Cl. ..... 114/105; 114/108

[58] Field of Search ..... 114/102–106, 114/108, 112

[56] References Cited

U.S. PATENT DOCUMENTS

| | | | |
|---|---|---|---|
| 1,613,890 | 1/1927 | Herreshoff . | |
| 2,107,303 | 2/1938 | Ljungstrom | 114/106 |
| 2,925,798 | 2/1960 | Colgate | 114/102 |
| 3,611,969 | 10/1971 | Hood | 114/106 |
| 3,658,025 | 4/1972 | Hood et al. | 114/105 |
| 3,749,043 | 7/1973 | Crall | 114/106 |
| 3,759,210 | 9/1973 | Davis | 114/105 |
| 3,802,373 | 4/1974 | Lagerquist | 114/105 |

FOREIGN PATENT DOCUMENTS

| | | | |
|---|---|---|---|
| 1488432 | 7/1967 | France | 114/102 |

OTHER PUBLICATIONS

Racing, Cruising & Design, Uffa Fox (1937) pp. 245–248, 325.

The Common Sense of Yacht Design, L. Francis Herreshoff (1946, 1974) pp. 21 & 22.

*Primary Examiner*—Trygve M. Blix
*Assistant Examiner*—Stephen P. Avila
*Attorney, Agent, or Firm*—Pearne, Gordon, Session, McCoy, Granger & Tilberry

[57] ABSTRACT

A double-groove headstay for sailboats, the grooves adapted to receive and retain jib boltropes so that a second jibsail can be hoisted while the first is still set. The second sail can be set and the first sail taken down, thus permitting continued drive while changing sails. The stays can be in lieu of conventional stays or provided with holes and clipped or threaded onto existing forestays.

23 Claims, 12 Drawing Figures

TWO GROOVE HEADSTAY

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of U.S. application Ser. No. 282,414 filed Aug. 21, 1972, *now U.S. Patent No. 3,851,608* which is made a part hereof and incorporated by reference herein.

BACKGROUND OF THE INVENTION

This invention relates generally to stays for sails, and more particularly to improved double-grooved forestay or jibstay arrangements by which it is possible to rapidly hoist, change and trim jibs.

Depending upon sailing conditions, it is frequently desirable to change jibs during the course of sailing. This is particularly true on sailboats used in racing. As can be readily appreciated, when it becomes desirable during a race to change from a jib of one size to one of a different size, the speed with which the change is made is extremely important. Most frequently, only one jibstay is employed and it is a wire or rod member.

When it is necessary to change jibs, the change is accomplished by lowering the first jib, removing it from the wire or rod, setting the second jib on the wire or rod and then raising the second jib. From the foregoing, it is apparent that valuable racing time is lost while the first jib is being lowered and removed and the second jib is being hoisted and trimmed.

One approach which the prior art tried in an attempt to speed up the jib changing process was the use of two separate jibstays or forestays, one for each jib. In order to maintain proper tension on both jibstays, it was necessary to replace the backstay and the related hardware with equipment which was capable of maintaining twice as much total tension on the pair of jibstays. Moreover, if such a costly "beefing up" of the backstay equipment were feasible, the use of two separate jibstays was still not a desirable solution to the problem. A second jibstay which was merely idle and not supporting a jib was undesirable from an aerodynamic standpoint. Additionally, a second jibstay involved a duplication of the equipment used in conjunction with the first stay, such as for anchoring the stay. This obviously increases the complexity and weight of the rigging.

Jib furling stays have been proposed in U.S. Pat. Nos. 3,611,969 and 3,658,025 which employ a single C-shaped member made of rolled stainless steel wherein the boltrope or bead of the jib is fed into the open portion of the C-shaped member. The C-shaped member can be rotated to furl the jib and it acts to support the mast. The cross section of the C-shaped member is relatively thin so that jibs with conventional clips can be applied around it. A disadvantage of these stays is that they do not have sufficient strength and torsional rigidity. Moreover, they do not permit the changing of jibs appreciably faster than the more conventional arrangements and they still require a period in which no jib is set and drawing.

In accordance with the present invention, there is provided a stay for a sail which is especially suited to receive and retain the beads or boltropes on the luffs of two jibs simultaneously. The stay preferably comprises a member which is oval shaped in cross section and has a pair of oppositely disposed, longitudinal slots through each of which boltropes of sails can extend. With the use of this stay, a second jib can be hoisted and set while the first sail is still in position, thereby preventing a loss of power during the changing of sails.

Accordingly, it is an object of the present invention to provide a stay which can accommodate two separate feed systems to allow two sails to be hoisted at the same time, thus reducing the time lost during any sail change.

It is also an object of the present invention to provide a streamlined stay having good aerodynamic characteristics which will cause a minimum of turbulence and disruption of the laminar air flow.

Other objects and advantages of the invention will become apparent upon reading the following detailed description and upon reference to the drawings in which.

Figure 1:
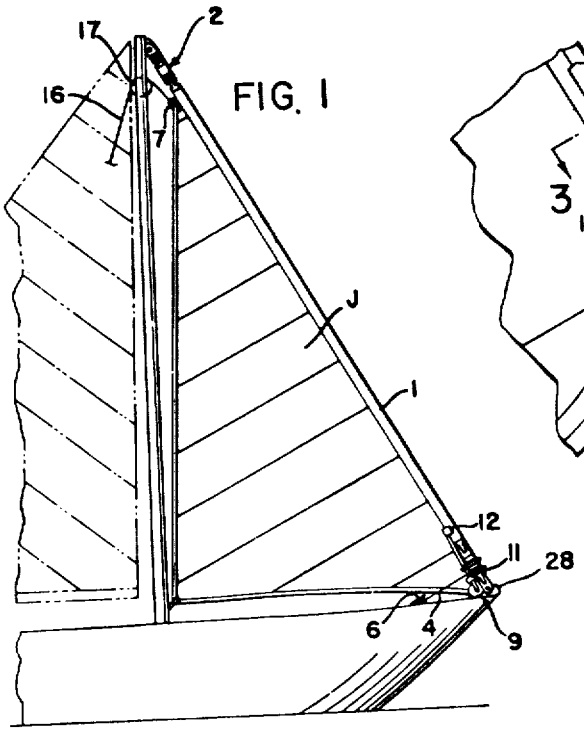
FIG. 1 is a side elevation of a sailboat employing a jibstay formed in accordance with an embodiment of the present invention.

Referring now to the drawings which are only for the purpose of illustrating preferred embodiments of the present invention, and not for the purpose of limiting the same, FIG. 1 shows a simple example of a typical sailboat rigging of the type which could employ the jibstay of the present invention. Typically, the jibstay 1 extends from the bow of the boat to the top of the mast. In the structural units, the jibstay is preferably anchored at its upper and lower ends by swivel means which permit it to be rotated about its longitudinal axis. These means could be of many types but are here illustrated as upper swivel 2 and bottom swivel 3. The bottom swivel 3 is provided with means to rotate the stay through at least 180° in either direction, which may comprise a furling line 4 wrapped about a furling drum 5 leading to a winch 6 mounted on the foredeck. When the line is unwound from the drum, it rotates the stay in a clockwise direction. When tension on the line is released, the stay is rotated back in a counterclockwise direction by reason of wind and sail forces. FIG. 1 shows the jib set. The jib, when set, is held at the top by halyard shackle 7 and at the bottom by a shackle or snap hook in eye 9 mounted on the deck at the bow in the conventional manner.

Figure 2:
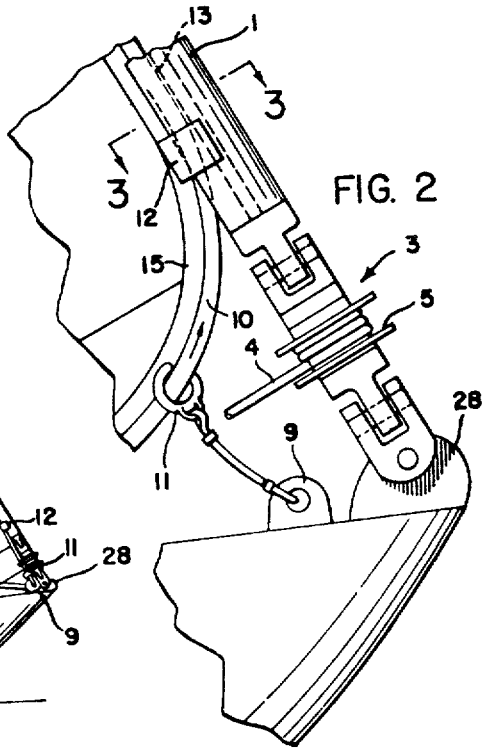
FIG. 2 is a side elevation, on a larger scale than FIG. 1, showing a jib being hoisted.

FIG. 2 shows the jib being hoisted, with the bead or boltrope 10 on the luff of the jib being guided by feed ring 11 and feeder 12 into groove 13 in the stay. The bead on the foreward edge or luff of the jib comprises the luff edge of the jib being wrapped around a rope or wire 14, and held firmly in place thereon by means of a binding 15. The binding may be a piece of heavy sailcloth material folded over this assembly and stitched or bonded to hold it in a fixed location with respect to the sail. It should be appreciated that other means can be used to interconnect the sail and jibstay. For instance, a plastic slug or hank can be used which fits into the groove or slot in the stay and is fastened to the sail like a normal hank.

The hoisting of the sail is accomplished by pulling up the head or tip of the jib by means of halyard shackle 7 which is attached to halyard 16 which goes over the halyard sheave 17, as is best shown in FIG. 1. Most modern boats have at least two such halyards.

The preferred form of the present invention is illustrated by reference to FIGS. 3 and 4, in which the stay or rod is elliptical in cross section and has two oppositely disposed fore-and-aft longitudinal grooves 13 and 18. in FIG. 3, the jib is illustrated as having been hoisted and set, the hib boltrope 10 being in groove 13 in the normally-aft position A. Groove 18 is facing the bow, in the normally-fore position F. In FIG. 4, the jibstay has been rotated approximately 180° in a clockwise direction so that the boltrope 10 is now bent as shown with the jib J extending past the stay. In addition, FIG. 4 shows the replacement jib J′ and its bead 10′ being hoisted through the groove 18 which in point of fact is now facing aft. Subsequently, jibstay may be rotated 180° counterclockwise and the original jib lowered, after which the stay will again be rotated 180° clockwise so that jib J′, now the only jib hoisted and set, will again be in the position shown in FIG. 4. In practice, I have found that the original jib J can often be lowered from the foreward position, as in FIG. 4, and it is usually not necessary to lower it from the aft position. The important feature of the present invention is that a stay be provided which permits a second or new sail jib, such as a No. 2 Genoa, to be hoisted and set when it is determined that the sail already set, such as a No. 1 Genoa, is no longer appropriate, but before that particular sail is lowered.

When both sails are up, as in FIG. 4, the old sail J lays smoothly along the existing sail with little disturbance of air flow. When the old sail is lowered and dropped to weather of the new sail, that is, inside the new sail, as in FIG. 4, it cannot go overboard because of the new sail. When it is dropped outside of the new sail, the outside wind pressure still keeps it against the new sail and prevents it from going overboard.

If desired, the bottom swivel 3 can be provided with means to lock it in position during the sail changing operation. Also it can have a short handle to rotate it through at least 180° instead of the furling line and winch shown in FIGS. 1 and 2. Most of the time the rod should be freely mounted on swivels so that it can be turned in the most advantageous position by wind forces acting on the sail. Both the top and bottom swivels are connected respectively to the masthead and to the bow with jaw and eye toggles as shown. Swivels are not necessary, however, for structural units. For the clip-on, non-structural units, such as shown in FIGS. 5–8, which units clip on a conventional forestay, there are no swivels. The clip-on units turn on the forestay.

At the lower end of the jibstay in the area adjacent the feed ring 11, the flanges which define the groove or slot 13 may be deformed outwardly, opening the slot so that it is wider than the bead 10. This allows for the initial entry of the bead into the groove of the stay. One or more fixtures such as feeder 12 may be mounted on the stay to facilitate entry of the jib into the groove. Such fixtures are known in the art and are shown in U.S. Pat. No. 3,658,025. This assembly, in whole or part as required, acts as means to feed the luff of the jib into the groove.

The foot of the jib is connected to an eye mounted on the bow such as eye 9. There is enough play between the eye and the entrance of the boltrope into the grooves in the stay to permit rotation of the stay 180°. If a roller furling gear is employed, however, the eye for the foot of the jib has to be mounted on the furling drum 5.

Stay lengths may vary from about 20 feet up to 80 feet or more. The sizes and dimensions have to be increased as the length increases in increments which can be determined by those skilled in the art. The cross section varies with strength considerations and with material used. Stays of the present invention which are structural, such as those shown in FIGS. 3, 4 and 9, are preferably made of an extruded aluminum alloy. The aluminum alloy which I prefer is 6351-T6. A stay made of this alloy for a 40-foot span should be about $\frac{3}{4}$ inch in width, along the minor axis, and about $1\frac{1}{8}$ inches along the major axis. I have reference to the cross-sectional shape shown in FIGS. 3 and 4 which is elliptical. The structural stays replace conventional forestays whereas the non-structural ones, such as shown in FIGS. 5–8, are clipped or threaded onto conventional forestays and do not have to have the same strength and other characteristics.

The 6351-T6 aluminum alloy has a breaking strength of 42,000 psi and a yield strength of 37,000 psi. A forestay of this material weighs slightly less than a comparable conventional wire forestay and has a cross-sectional area more than three times as large. The twisting moment yield strength of structural units of the present invention [shoud] *should* preferably be at least 2000 inch-pounds.

I believe that other materials which have properties comparable to extruded aluminum may also be used, such as titanium and magnesium. Structural double-groove stays should have minimum breaking strength and torsional strength comparable to the forestays now used. In addition to physical properties, any material must resist marine corrosion and otherwise be satisfactory for marine use. Cost of the material and of fabrication is also a factor and is another reason why I prefer aluminum.

Boltrope diameters vary from about 3/16 inch to 5/16 inch in diameter. The slots or grooves in the stay are preferably round and are slightly larger in diameter than the boltropes to be received therein. The grooves, such as grooves 13 and 18, are inset from the rod surface a distance 20 which is approximately equal to the width of the slot 19 or slightly less than the groove radius R. When so inset, rounded flanges 21 are formed which define the entrance to the groove. The slot 19 leaves enough room for the sail but is too narrow for the boltrope so that flanges 21 prevent and restrain the boltrope from coming out of the grooves. The grooves and flanges are related so that the groove is almost a full circle, the slot 19 representing perhaps 40°-50° of arc or opening.

Figure 3:
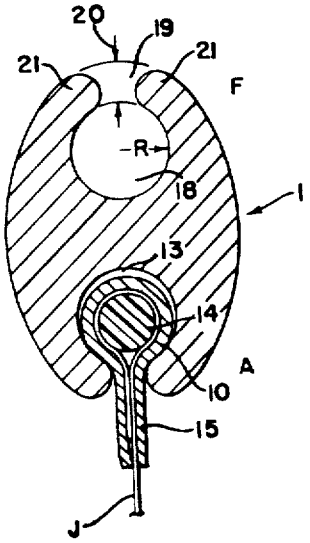
FIG. 3 is a cross-sectional view taken on the line 3—3 of FIG. 2 and on a larger scale of the fore-and-aft, double-groove headstay.
Figure 4:
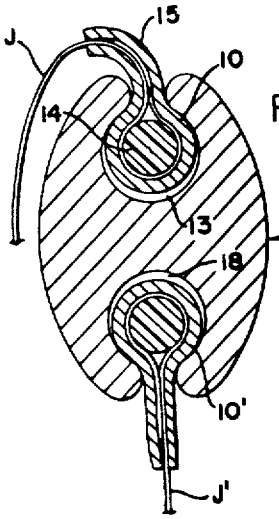
FIG. 4 is a cross section similar to FIG. 3 taken during a step of the sail changing process.
Figure 5:
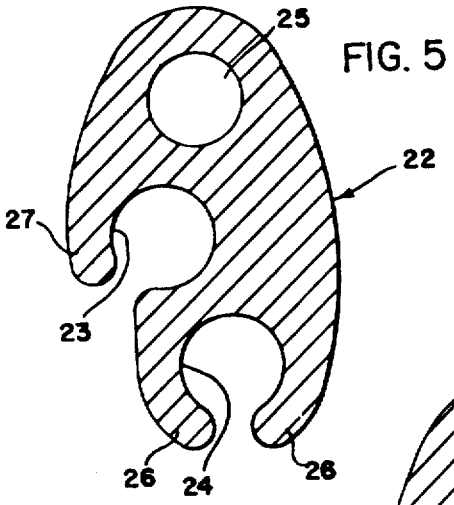
FIG. 5 is a cross-sectional view of an alternative form of a double-grooved headstay characterized in being a clip-on, non-structural unit with offset aft grooves.

Instead of having two grooves in a fore-and-aft position as shown in FIGS. 3 and 4, I can have the grooves staggered as in stay 22 in FIG. 5. Here, the first groove 23 is foreward and offset slightly to one side of the second groove 24. The cross-sectional shape is still roughly elliptical or foil-shaped with one groove on one side of the major axis and the other groove on the other side of the major axis. The foreward groove is slightly closer to the major axis. Rounded flanges 26 at the aft of the stay define groove 24. Groove 23 is defined by a flange 27 at one side of the stay, the base of one of the flanges 26 and the central body portion of the stay. The central hole 25 is intended to receive a conventional wire or rod forestay. I contemplate that sections or pieces of a unit can thus be made up, attached together and strung on a conventional wire forestay to achieve an effect similar to that of FIGS. 3 and 4.

Figure 6:
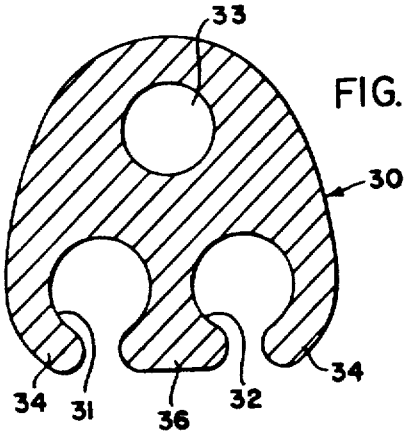
FIG. 6 is a cross-sectional view of a second alternative form of a double-grooved headstay characterized in being a clip-on, non-structural unit with side-by-side aft grooves.

Still another alternative cross-sectional shape is shown in stay 30 in FIG. 6. Here, the two boltrope-receiving grooves 31 and 32 are side-by-side, aft, and the shape of the unit is rounder and thicker, like half an oval, so that it is less attractive from an aerodynamic or windage viewpoint. A central flange 36 at the aft of the stay has two rounded groove-defining portions which, together with side flanges 34 define grooves 31 and 32.

Stays 22 and 30 can be mounted on swivels only and do not require means to rotate the stay. When so mounted, they naturally rotate and present the most advantageous angle to the wind. The pull of the jib luff and the tightness of the jib sheet combined with the forces of the wind orient the stays when so mounted.

Figure 7:
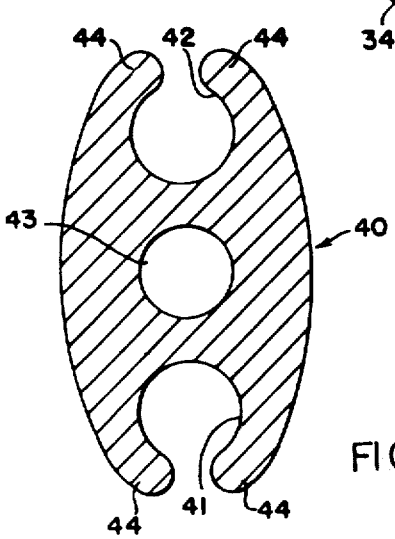
FIG. 7 is a cross-sectional view of a third alternative form of a double-grooved headstay similar to FIG. 3 but being a non-structural clip-on unit.

FIG. 7 shows a stay 40 similar to that of FIGS. 3 and 4 except that it additionally has a central hole 43 to accommodate a jib wire stay. As in the stay of FIGS. 3 and 4, the boltrope-receiving and retaining grooves 41 and 42 are defined by flanges 44.

When any of the stays with a hole in them, as in FIGS. 5 and 7, are used, they need not bear the strain of the mast because the conventional jib wire or rod member does that. They can, consequently, be made in sections of about four or more feet in length and fastened together by pins or screws or otherwise so that they act as a single piece. Likewise, they *are torsionally resistant and* do not have to be as strong as the other units. They can be made of aluminum or plastic, such as glass reinforced polyester resin or high density polypropylene.

Figure 8:
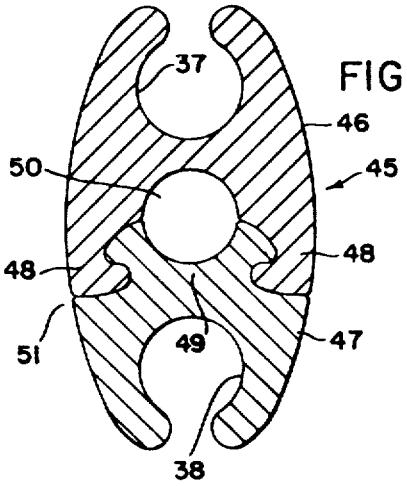
FIG. 8 is a cross-sectional view of a fourth alternative form of a double-grooved headstay, similar to FIG. 3, except that it is a two-piece non-structural, clip-on unit.
Figure 9:
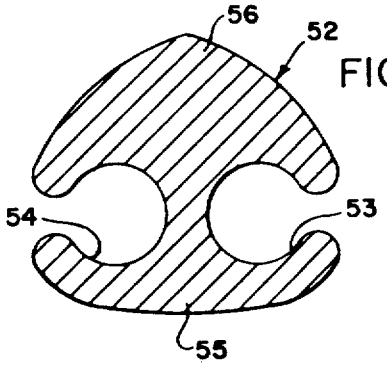
FIG. 9 is a cross-sectional view of a fifth alternative form of a double-grooved headstay, the grooves being on opposite sides.

FIG. 8 shows another fore and after two groove stay 45 which is similar to that of FIG. 7 except that it is assembled from two pieces which are interfitted together. The forward member 46 and aft member 47 interfit over the forestay with male member 49 sliding into the retaining groove defined by the flanges 48. The pieces 46 and 47 can be made of aluminum or plastic such as polypropylene and hinged together along one side, as at 51. They can be interfitted by spreading flanges 48, if of resilient material, or by longitudinally sliding flanges 49 into the groove defined by flanges 48. The latter arrangement permits them to be clipped on without removing the existing wire or rod forestay. Grooves 37 and 38 are comparable to grooves 18 and 13 of FIG. 3.

FIG. 9 shows still another stay, in this instance with the grooves side-by-side. This unit has a relatively straight aft portion 55 and a rounded nose or front portion 56 with arcuate side portions as shown. The two boltrope-receiving grooves 53 and 54 are inset abreast in a side-by-side relationship in the aft portion 55. The cross-sectional shape is that of a triangle with rounded sides.

Figure 10:
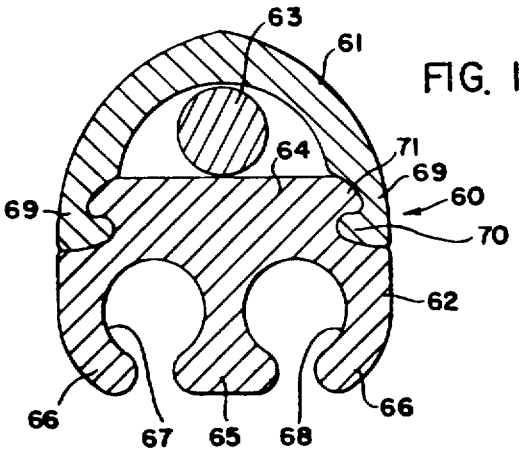
FIG. 10 is a cross-sectional view of a sixth alternative form of a double-grooved headstay, similar to FIG. 6, except that it is a two-piece non-structural, clip-on unit.

FIG. 10 shows still another stay 60. This is a two-piece unit made up of a foreward dome-shaped piece 61 with side flanges or legs 69 that fit over the jibstay 63 and the rear or aft piece 62. The flanges 69 have bottom ribs or beads 70 which embrace and interfit with the ribs on beads 71 at the top of the rear piece 62. The rear piece has in its aft portion two side-by-side, inset boltrope-receiving grooves 67 and 68 defined by central flange 65 and side flanges 66. Ridge 64 with beads 71 interfits with flanges 69 in the assembly as shown. These units are preferably made of extruded aluminum.

As can be seen from the drawings, the stays of the present invention are generally oval shaped or elliptical in cross section. The major axis is in the fore-and-aft direction and the minor axis runs from one side of the ship to the other, port to starboard. In the species of FIGS. 3 and 4, the length or major axis is approximately twice as large as the minor axis. The diameters of the grooves are preferably less than half the width of the minor axis. The grooves are preferably circular but can be other rounded shapes to accommodate the bead of the luff of the jib. The important consideration is that they have a relatively narrow neck and flange portions which grip the bead of the jib and retain it in the groove.

The stay cross sections are preferably rounded with arcuate outer surfaces which provide enough cross-sectional area to have suitable strength and torsional rigidity and accommodate the grooves or slots depending upon how they are located.

The rounded grooves may be thought of as longitudinal cylinders inset into the forestay or rod and substantially coextensive with it. The axes of such cylinders are parallel to each other and to the axis of the rod and the distance between the longitudinal axes of said cylinders is preferably at least 1½ times the radius of the larger cylinder.

When the grooves are both aft and staggered as in FIG. 5, the stay is necessarily wider and the width is more than 50 percent of the length. When the grooves are both side-by-side and aft as in FIG. 6, the cross-sectional shape is rounded with the aft portion truncated or cut off at the two side-by-side grooves. This form of the invention results in the widest of all the stays.

It is to be understood that double-grooved stays can be make like FIGS. 5 and 6 without clip-on holes or holes can be provided in the stays of FIG. 9. In all the drawings, the top is the front or foreward portion and the bottom is the rear or aft portion.

Figure 11:
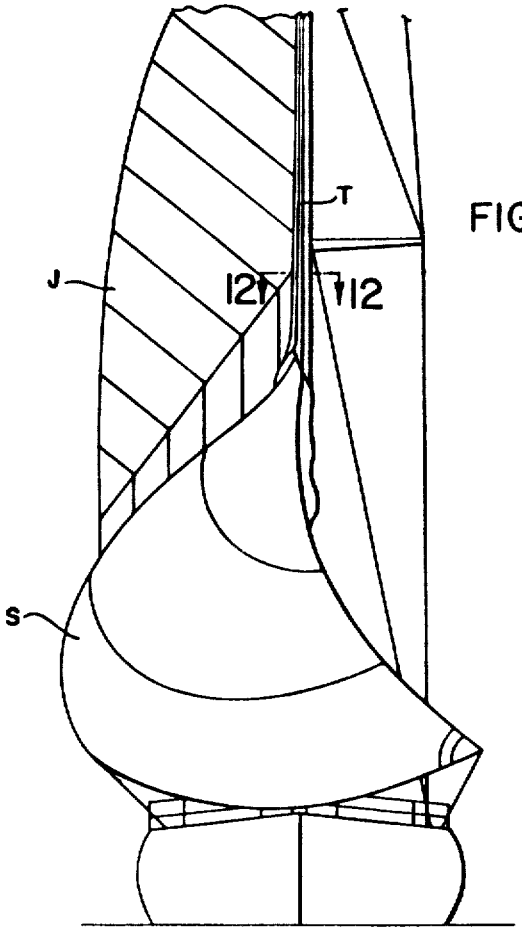
FIG. 11 is a front view of a sailboat with a spinnaker turtle of the present invention in the front groove of a double-grooved headstay with the spinnaker partly broken out.
Figure 12:
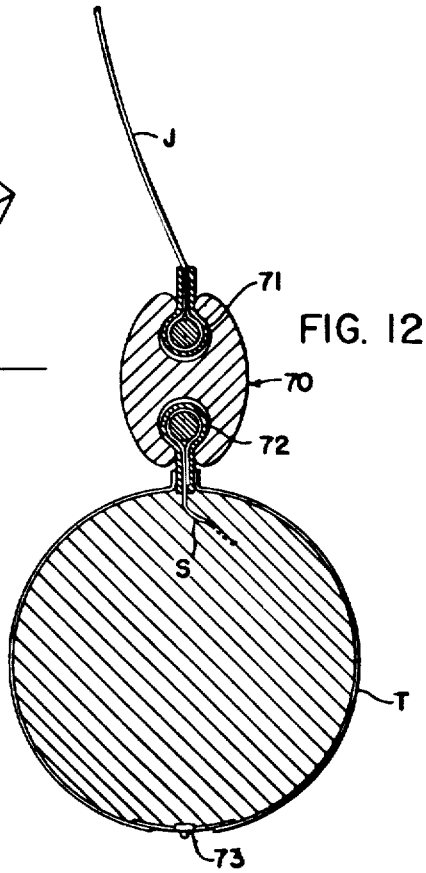
FIG. 12 is a cross-sectional view taken through line 12—12 of FIG. 11 showing the turtle in position enveloping the spinnaker.

One advantage of the stay of FIGS. 3, 4, 7 and 8 is that it can be used with a spinnaker turtle of the present invention as shown in FIG. 11. This is a view from the bow of a sailboat with a partially opened spinnaker S contained at its upper portion by a spinnaker turtle T.

Here the stay 70 is one like that of FIGS. 3 and 4 with fore-and-aft grooves. The boltrope 71 of the Genoa jib is in the aft groove. The boltrope of the spinnaker turtle 72 is in the foreward groove.

The turtle comprises a substantially rectangular piece of cloth, long and narrow, with a boltrope 72 attached thereto running down the middle lengthwise. The turtle is wide enough to envelop a spinnaker and the sides are provided with connecting means such as a zipper 73 so that the spinnaker can be enveloped in the spinnaker and hoisted up the stay with the boltrope in the foreward groove. The connecting means is readily released by tearing the zipper open at the bottom and then permitting the opening spinnaker to free itself. Other connecting means to keep the spinnaker contained in the turtle such as a slippery rope in a series of eyelets or what is called rotten cord, which easily breaks, can be used as will be apparent to skilled sailors. The turtle can be made of synthetic fiber cloth and, for a standard spinnaker for a 38-foot sailboat, might be 25 feet long, 6 inches wide, and only 2 inches in diameter when containing a spinnaker.

Another advantage of my two-grooved stay is that in running downwind, a jib can be hoisted in each groove and held out on opposite sides of the boat with whisker poles or the like as desired. The modification of FIG. 9 is particularly adapted to this use.

Another advantage of the fore-and-aft double-groove unit of the present invention, such as shown in FIGS. 3, 4, 7 and 8, is that the stays can also be used to furl or partially furl the jib as desired. Suitable furling gear is shown in U.S. Pat. No. 3,611,969. Since the stays have good torsional rigidity *or are torsionally resistant*, this can be done in any force breeze. The furling gear may be installed and removed easily as desired.

Still another additional feature of the present invention is the ability to hoist and sail with two jibs at the same time. A yacht can hoist a high clew jib topsail along with a low clew light No. 1 to sail to weather in light air. The additional area of this rig seems to be faster than the more conventional double head rig in certain conditions.

Modifications and alterations of the preferred embodiments will occur to others upon a reading and understanding of the specification and it is my intention to include all such modifications and alterations as part of my invention insofar as they come within the scope of the appended claims.

Having thus described my invention, what I claim is:

1. A jibstay assembly for a sailboat comprising a longitudinal member extending and supported between the bow portion of the boat and the upper portion of the boat mast, said member being *torsionally resistant*, generally rounded in cross-sectional shape and having two grooves inset therein, each of which is adapted to slidably receive and release and to hold a bead at the luff of a jib sail[.] *and facilitate the changing of jib sails.*

2. The combination of claim 1 above in which said member is attached between two swivels, the bottom swivel being provided with means to rotate it and said member through at least 180° in at least one direction.

3. The apparatus of claim 1 in which said member is elliptically shaped in cross section with the major axis running in the fore-and-aft direction and has two opposed grooves therein at the opposite ends of the major axis of the ellipse, the grooves being round in cross section and inset in said member a distance slightly less than their radii so as to receive and retain the bead at the luff of jib sails, the [stay] *member* having sufficient moment of inertia, strength and rigidity to resist torsional twisting forces said [unit] *member* having a minimum twisting moment yield strength of 2000 inch-pounds.

4. The jibstay of claim 3 above of corrosion-resistant aluminum alloy which is an aluminum extrusion.

5. The apparatus of claim 1 in which said member is shaped in cross section like half an oval and has two side-by-side grooves in the aft portion which are adapted to receive and retain the bead at the luff of a jib.

6. The apparatus of claim 1 in which said member is oval shaped in cross section and has two grooves therein, the first groove being aft and to one side of the other groove, each groove being adapted to receive and retain the bead at the luff of a jib.

7. The apparatus of claim 1 in which said member is a rounded triangular shape in cross section and has two side-by-side grooves which are abreast, each groove being adapted to receive and retain the bead at the luff of a jib.

8. A jib stay assembly for a sailboat comprising a stay from the bow of the boat to the top portion of the mast, a plurality of units mounted on and supported by said stay to comprise a longitudinal member, said units together providing two grooves in said member adapted to slidably receive and release and to retain the bead at the luff of a jib, and means fastening together and aligning said units to form a continuous *torsionally resistant* member providing two substantially coextensive jib luff receiving grooves substantially throughout the length of said stay.

9. The assembly of claim 8 in which the plurality of units are elliptical in cross section and have two opposed grooves therein at the opposite ends of the major axis of the ellipse, the grooves being round in cross section and adapted to receive and retain the bead at the luff of jib sails.

10. The assembly of claim 8 provided with means adjacent to bow to rotate said plurality of units.

11. The assembly of claim 8 in which said units are comprised of two interfitting pieces which assemble and interfit over the stay.

12. The assembly of claim 8 in which said units are provided with holes passing longitudinally through them for receiving the stay on which to mount and support said units.

13. A torsion-resistant stay for receiving and retaining the beads on the luffs of two jibs simultaneously, comprising:

an elongated, extruded aluminum, generally oval-shaped member having a pair of oppositely disposed longitudinal slots through each of which the beads on the luffs of said sails can extend, a pair of generally arcuate outer surfaces connecting said slots, and first and second inner surfaces, each of said inner surfaces meeting each of said arcuate outer surfaces in a pair of slot-defining surfaces;

said first inner surface generally defining a portion of a cylinder and a first longitudinal axis of curvature;

said second inner surface generally defining a portion of a cylinder and a second longitudinal axis of curvature;

said generally arcuate outer surfaces having a maximum perpendicular separation of at least 1½ times the diameter of the larger of said cylinders;

and said first and second axes of curvature being substantially parallel, and separated by a distance at least $1\frac{1}{2}$ times the diameter of the larger of said cylinders, such that when the first of said sails is in use, said stay can be rotated and the second of said sails hoisted and trimmed while said first sail is still in position, thereby preventing a loss of power during the changing of sails.

14. A jibstay assembly for a sailboat comprising:

a first swivel member at the bow of the boat, a second swivel member attached to the top portion of the mast, a *torsionally resistant* longitudinal member attached between said first and second swivel members, said member having two rounded grooves therein which are inset from the surface of the rod a distance slightly less than their radius and are provided with entrance slots defined by rounded flanges which retain the boltropes of jib sails, the diameters of the grooves being slightly larger than the boltropes of the jib sails, and means to feed the beads at the luff of jib sails into said grooves.

15. The method of changing from a first sail to a second sail while sailing, so that there will at all times be a sail properly set, said method comprising the steps of:

providing a stay having at least first and second longitudinal slots and mounted for rotation generally about its longitudinal axis, said first sail having been hoisted and set in the first longitudinal slot;

rotating said stay such that said second longitudinal slot is facing the direction in which said second sail will extend;

hoisting and setting said second sail while said first sail is still in operative position;

rotating said stay such that said first longitudinal slot again is facing the direction in which said first sail extends;

lowering said first sail; and, rotating said stay such that said second longitudinal slot again faces the direction in which said second sail extends, thereby changing to a more appropriate sail without a loss of power during the change.

16. The method of claim 15 wherein said longitudinal slots are oppositely disposed.

17. A torsion-resistant forestay for a jibsail, especially suited to receive and retain the beads on the luffs of two jibsails simultaneously, comprising:

an elongated, generally oval-shaped member having a pair of oppositely disposed fore-and-aft longitudinal slots through each of which the beads of one of said sails can extend, a pair of generally arcuate outer surfaces connecting said slots, and first and second inner surfaces defining said slots;

said first inner surface generally defining most of a cylinder substantially coextensive with the forestay;

said second inner surface generally defining most of a cylinder substantially coextensive with the forestay;

said cylinders being substantially parallel with their longitudinal axes separated by a distance greater than the diameter of the larger of said cylinders, each of said inner surfaces further defining the above-said fore-and-aft, jibsail bead receiving longitudinal slots.

18. A torsion-resistant stay for receiving and retaining the beads on the luffs of two jibs simultaneously, comprising:

an elongated, extruded aluminum, generally oval-shaped member having a pair of oppositely disposed longitudinal grooves through each of which the beads of one of said sails can extend, a pair of generally arcuate outer surfaces connecting said grooves, and first and second inner surfaces, each of said inner surfaces meeting each of said arcuate outer surfaces in a pair of entrance slot-defining surfaces;

said first inner surface further generally defining a portion of a longitudinal cylinder substantially coextensive with the forestay;

said second inner surface further generally defining a portion of a longitudinal cylinder substantially coextensive with the forestay, the longitudinal axes of said cylinders being parallel to each other and to the longitudinal axis of the forestay, said inner surfaces thereby defining the said longitudinal grooves.

19. A jibstay assembly for a sailboat comprising a stay from the bow of the boat to the top portion of the mast, a plurality of units mounted on and supported by said stay, each individual unit having one groove therein adapted to slidably receive and release and to retain the bead at the luff of a jib, and means fastening together and aligning said [unit] *units* to form a continuous *torsionally resistant* member providing two substantially coextensive jib luff receiving grooves substantially throughout the length of said stay.

*20. A jib stay assembly for a sailboat comprising a conventional wire or rod stay from the bow of the boat to the top portion of the mast,*

*a plurality of units mounted on and supported by said stay to comprise a longitudinal member, said units together providing two grooves in said member, and*

*means fastening together and aligning said units to form a continuous torsionally resistant member on said stay, said two grooves being substantially coextensive throughout the length of said stay and being adapted to slidably receive and release and to retain the bead at the luff of a jib.*

*21. The assembly of claim 20 in which said units are comprised of two longitudinally interfitting pieces which assemble and interfit over the stay.*

*22. The assembly of claim 20 in which said units are provided with holes passing longitudinally through them for receiving the stay whereby said units are mounted and supported.*

*23. The assembly of claim 20 in which the plurality of units provide two side-by-side aft grooves.*

* * * * *